United States Patent
Fujikawa

[11] Patent Number: 6,102,176
[45] Date of Patent: Aug. 15, 2000

[54] HYDRAULIC CIRCUIT FOR TRANSMISSION

[75] Inventor: Atsushi Fujikawa, Saitama, Japan

[73] Assignee: Honda Giken Kogyo Kabushiki Kaisha, Tokyo, Japan

[21] Appl. No.: 09/264,237

[22] Filed: Mar. 8, 1999

[30] Foreign Application Priority Data

Mar. 10, 1998 [JP] Japan .................................... 10-57827

[51] Int. Cl.$^7$ ............................................... F16H 61/12
[52] U.S. Cl. ........................ 192/3.58; 192/85 R; 477/906
[58] Field of Search ................................. 192/3.58, 3.63, 192/85 R; 477/48, 906

[56] References Cited

U.S. PATENT DOCUMENTS

| | | | |
|---|---|---|---|
| 5,665,023 | 9/1997 | Aoki et al. ............................ | 477/906 X |
| 5,681,241 | 10/1997 | Kubo et al. ........................... | 477/906 X |
| 5,944,626 | 8/1999 | Spiess et al. ......................... | 477/906 X |

*Primary Examiner*—Richard M. Lorence
*Attorney, Agent, or Firm*—Sughrue, Mion, Zinn, Macpeak & Seas, PLLC

[57] ABSTRACT

A hydraulic circuit for a transmission, according to the present invention, comprises a regulator valve (31), a plurality of control valves (34, 35, 45), a restrictor (41), a bypass oil passage (61), a bypass closing valve (42), and a signal pressure generating valve (48). The regulator valve regulates oil discharged from a hydraulic pump driven by a motor to produce line pressure. The plurality of control valves control an operation of the transmission using the line pressure. The control valves include at least one electric control valve. The restrictor is formed on a discharge oil passage which is connected to the regulator valve. The bypass oil passage connects the upstream side and the downstream side of the restrictor while bypassing the restrictor. The bypass closing valve is closable the bypass oil passage by receiving oil pressure produced when the electric control valve breaks down. The signal pressure generating valve generates a signal pressure which corresponds to one of oil pressure on the upstream side of the restrictor and an oil pressure difference between the upstream side and the downstream side when the bypass oil passage is closed. Accordingly, the regulation of line pressure by a regulator valve is not influenced for generating signal pressure corresponding to the speed of the motor and controlling oil pressure when failure occurs.

2 Claims, 8 Drawing Sheets

HYDRAULIC CIRCUIT FOR TRANSMISSION

BACKGROUND OF THE INVENTION

The present invention relates to a hydraulic circuit for producing signal pressure for controlling the operation of a transmission and, more particularly, relates to a hydraulic circuit for obtaining signal pressure corresponding to the rotation of an engine. The present invention may be used for the control of a starter clutch of a transmission, for example.

Generally in a transmission for a vehicle, a clutch for controlling motive power transmission when a vehicle is started or stopped is provided between an input side member driven by a motor and an output side member coupled to a vehicle. When a vehicle is started or stopped, the engagement of the clutch is controlled. It is generally known that the control of engagement is executed by controlling oil pressure. But oil control for the operation of such a starter clutch is mostly executed by detecting the rotational frequency of a motor and driving an electric control valve by a quantity corresponding to the rotational frequency. The rotational frequency of the motor is detected by a sensor, and the like.

In such an oil control system using an electric control valve, to avoid the failure of oil control in case of an electric failure—such as a malfunction in the control system when a valve spool is stuck open—a backup unit for generating signal pressure corresponding to the rotational frequency of a motor is typically provided to execute oil control. For the backup unit, a type using a pitot tube is known and, referring to FIG. 8, the configuration of the unit will be described below.

A disc pitot flange 82 is provided with an oil chamber 82a the outer periphery of which is bent on the side of the inner periphery and fixed to a rotating member 81 driven by a motor. Oil 83 is supplied to the oil chamber 82a via an oil delivery pipe 85 branching from an oil passage 84 and the detection part 86a of a pitot tube 86 is inserted into the oil 83. The pitot tube 86 is connected to an oil chamber 87c of a signal pressure generating valve 87. When an input member 81 is rotated, the pitot flange 82 is also integrally rotated, however, at this time, the oil 83 in the oil chamber 82a is also turned along the wall of the oil chamber 82a because of its viscosity. At this time, as the pitot tube 86 detects the dynamic pressure of the turned oil 83 and supplies oil 83 equivalent to the rotational frequency of the pitot flange 82 to the oil chamber 87c of the signal pressure generating valve 87, a spool 87a is driven right against a spring 87b. Hereby, signal pressure (pitot pressure) corresponding to the rotational frequency of a motor is output to an oil passage 88.

In Japanese Patent Unexamined Publication No. Hei. 6-26565, a hydraulic control for controlling lubrication oil corresponding to the rotational speed of a pulley of a V belt-type continuous variable transmission is disclosed and an example in which oil pressure corresponding to rotational speed is produced using a pitot tube is disclosed as prior art.

However, in a signal pressure generator using such a pitot tube as described above, as space for installing the pilot flange 82 is required, the size in the axial direction is increased by the dimention of the pilot flange quantity and a transmission itself is made larger. According to the hydraulic control disclosed in the above patent application, a pitot flange is not required and a transmission can be miniaturized. However, it is also considered that the oil pressure of oil discharged from a regulator valve has an effect upon the regulation of line pressure by the regulator valve.

SUMMARY OF THE INVENTION

The present invention is made in view of the above problems and the object is to construct the hydraulic circuit of a transmission so that when an electric failure—such as a malfunction in the control system when a valve spool is stuck open—occurs, oil control such as the control of the engagement of a starter clutch can be executed by generating signal. Further, in the transmission hydraulic circuit of the present invention, pressure corresponding to the rotational frequency of a motor as the oil control has no effect upon the regulation of line pressure by a regulator valve.

The above-mentioned object can be achieved by a hydraulic circuit for a transmission, according to the present invention, comprising:
- a regulator valve for regulating oil discharged from a hydraulic pump driven by a motor to produce line pressure;
- a plurality of control valves for controlling an operation of the transmission using the line pressure, the control valves including at least one electric control valve;
- a restrictor formed on a discharge oil passage which is connected to the regulator valve;
- a bypass oil passage for connecting the upstream side and the downstream side of the restrictor while bypassing the restrictor;
- a bypass closing valve for closing the bypass oil passage by receiving oil pressure produced when a supply of power to the electric control valve is stopped down; and
- a signal pressure generating valve for generating signal pressure which corresponds to one of oil pressure on the upstream side of the restrictor and an oil pressure difference between the upstream side and the downstream side when the bypass oil passage is closed.

In the above-mentioned hydraulic circuit, it is preferable that the signal pressure be supplied to a starter clutch of the transmission in such a manner that the starter clutch is controlled on the basis of the signal pressure when a failure of the transmission has occurred.

As normally, as the bypass closing valve opens the bypass oil passage according to such composition, oil discharged from the regulator valve is smoothly discharged without passing the restrictor. Therefore, discharge pressure from the regulator valve is not increased and line pressure is not influenced.

In the meantime, as the bypass closing valve closes the bypass oil passage when failure—such as an electric malfunction in the control system when a valve spool is stuck open—occurs, oil discharged from the regulator valve passes the restrictor and at this time, the signal pressure generating valve generates signal pressure corresponding to oil pressure on the upstream side of the restrictor or the difference of oil pressure between the upstream side and the downstream side, that is, signal pressure corresponding to the quantity of oil discharged from the regulator valve. The above quantity of discharged oil is in proportion to the quantity of oil discharged from the hydraulic pump and corresponds to the rotation of an engine (a motor). As clear from the above description, signal pressure obtained as described above is oil pressure corresponding to the rotation of an engine and oil pressure equal to signal pressure (pitot pressure) obtained using a pitot tube is obtained.

In the case of this circuit, space for installing a pitot flange is not required, the size in the axial direction can be reduced by the dimention of the pilot flange and the whole transmission can be miniaturized. A new pipe is not required and the cost can be reduced.

DESCRIPTION OF THE PREFERRED EMBODIMENTS

Figure 1:
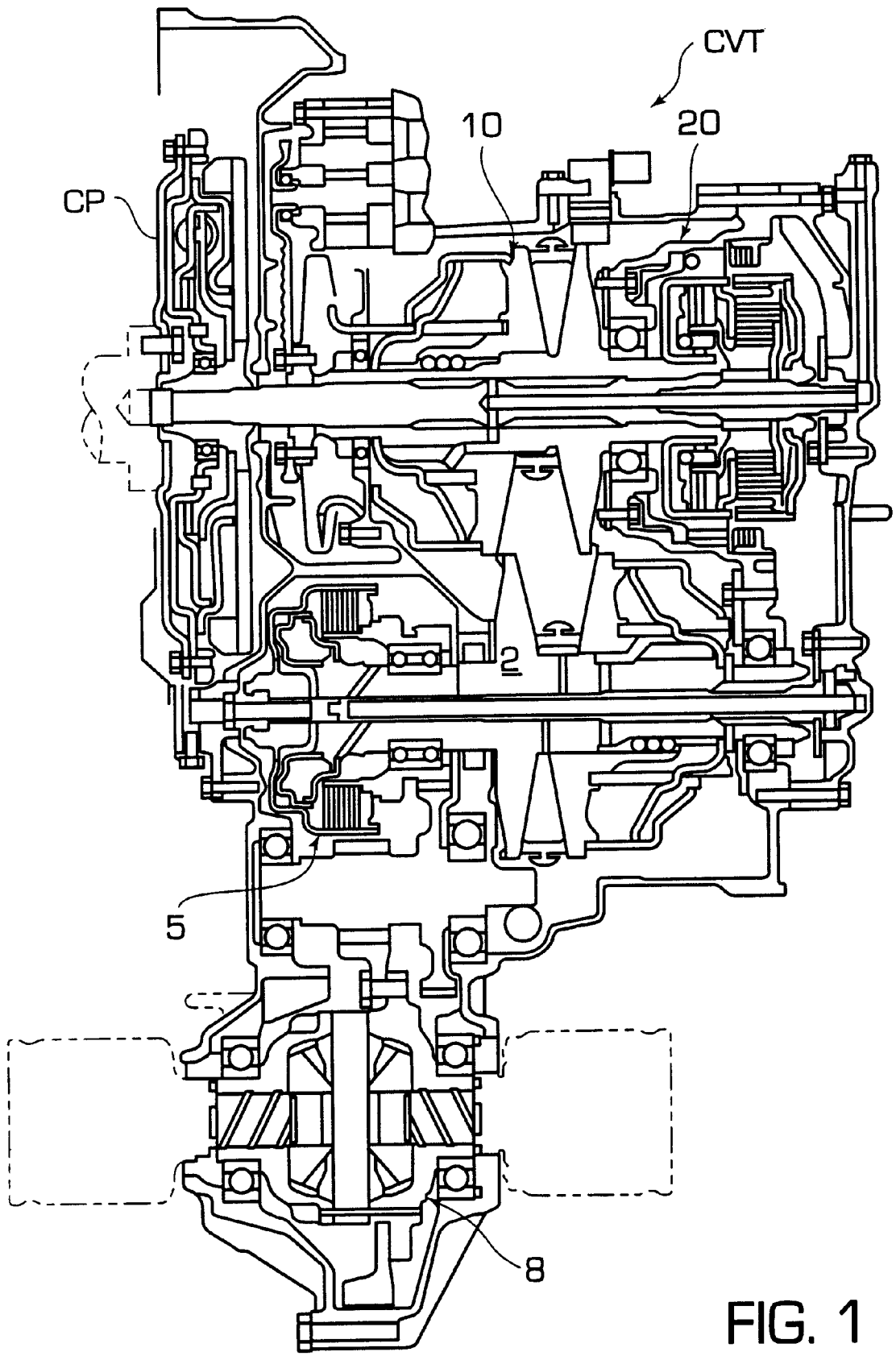
FIG. 1 is a sectional view showing a continuous variable transmission provided with a hydraulic circuit according to the present invention.
Figure 2:
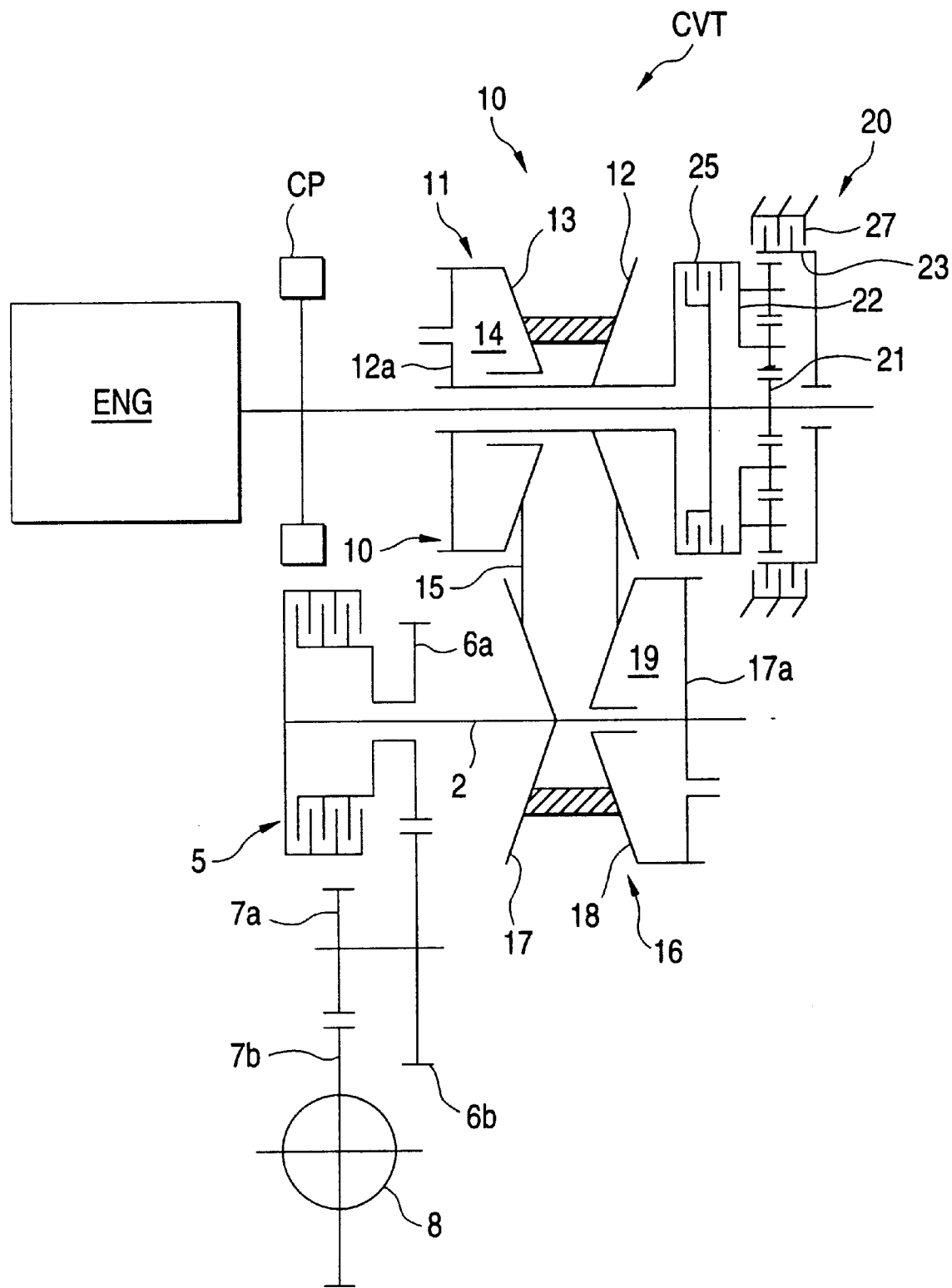
FIG. 2 is a schematic drawing showing the motive power transmission path of the continuous variable transmission.

Referring to the drawings, the preferred embodiments of the present invention will be described below. FIGS. 1 and 2 show the construction of a continuous variable transmission provided with a hydraulic circuit according to the present invention. The continuous variable transmission in this embodiment is of a belt-type continuous variable transmission using a metallic V belt. The belt continuous variable transmission CVT is comprised of a metallic V belt mechanism 10 arranged between an input shaft 1 and a counter shaft 2, a planetary gear forward/backward travel switching mechanism 20 arranged between the input shaft 1 and a movable pulley 11 on the drive side (hereinafter refer to a drive side movable pulley 11) and a starter clutch 5 arranged between the counter shaft 2 and an output member such as a differential mechanism 8. This continuous variable transmission CVT is used for a vehicle, the input shaft 1 is connected to the output shaft of an engine ENG via a coupling mechanism CP and motive power transmitted to the differential mechanism 8 is transmitted to right and left wheels.

The metallic V belt mechanism 10 is comprised of the drive side movable pulley 11 arranged on the input shaft 1, a movable pulley on the driven side (hereinafter refer to a driven side movable pulley) 16 arranged on the counter shaft 2 and a metallic V belt 15 wound between both pulleys 11 and 16.

The drive side movable pulley 11 is comprised of a stationary pulley half 12 arranged on the input shaft 1 so that the half can be rotated and a movable pulley half 13 which can be relatively moved to the stationary pulley half 12 in an axial direction. On the side of the movable pulley half 13, a drive side cylinder chamber 14 is formed by surrounding it by a cylinder wall 12a connected to the stationary pulley half 12 and lateral pressure for moving the movable pulley half 13 axially is generated by oil pressure supplied to the drive side cylinder chamber 14.

A driven side movable pulley 16 is comprised of a stationary pulley half 17 fixed to the counter shaft 2 and a movable pulley half 18 which can be relatively moved in the axial direction respect to the stationary pulley half 17. On the side of the movable pulley half 18, a driven side cylinder chamber 19 is formed by surrounding it by a cylinder wall 17a connected to the stationary pulley half 17 and lateral pressure for moving the movable pulley half 18 axially is generated by oil pressure supplied to the driven side cylinder chamber 19.

Therefore, suitable pulley lateral pressure for preventing the belt 15 from being off can be set by suitably controlling oil pressure supplied to both of the above-described cylinder chambers 14 and 19, the width of both pulleys 11 and 16 can be varied and, thereby, the transmission gear ratio can be varied steplessly and continuously by varying a radius in which the V belt 15 is wound.

The planetary gear forward/backward travel switching mechanism 20 is provided with a double pinion-type planetary gear train, its sun gear 21 is connected to the input shaft 1, a carrier 22 is connected to the stationary pulley half 12 and a ring gear 23 can be fixed and held by a backward brake 27. The planetary gear forward/backward travel switching mechanism is also provided with a forward clutch 25 which can connect the sun gear 21 and the ring gear 23, when the forward clutch 25 is engaged, all gears 21, 22 and 23 are rotated with them integrated with the input shaft 1 and the drive side pulley 11 is driven in the same (forward) direction as the input shaft 1. In the meantime, as the ring gear 23 is fixed and held when a backward brake 27 is engaged, the carrier 22 is driven in the reverse direction to the sun gear 21 and the drive side pulley 11 is driven in a reverse (backward) direction to the input shaft 1.

The starter clutch 5 is a clutch for controlling the transmission of motive power between the counter shaft 2 and the output side member, when the clutch is engaged, motive power can be transmitted between both and the capacity of transmitted torque between the input side also and the output side can be controlled by controlling engagement. Therefore, when the starter clutch 5 is engaged, the output of the engine transmitted by the metallic V belt mechanism 10 is transmitted to the differential mechanism 8 via gears 6a, 6b, 7a and 7b and divided into right and left wheels not shown by the differential mechanism 8. When the starter clutch 5 is released, motive power is not transmitted and the transmission is neutral.

Figure 3:
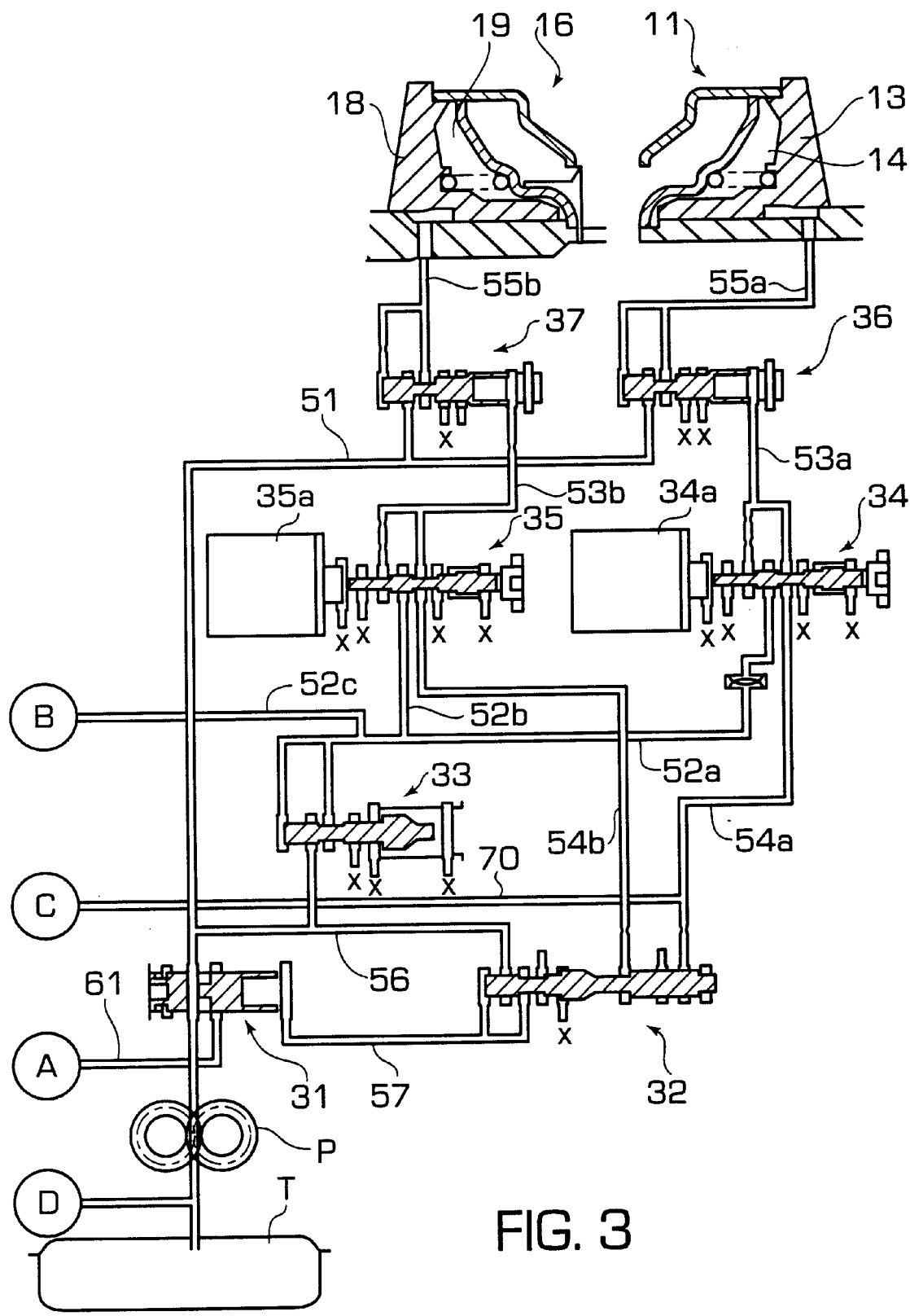
FIG. 3 shows the composition of a hydraulic circuit equivalent to an embodiment of the present invention.
Figure 4:
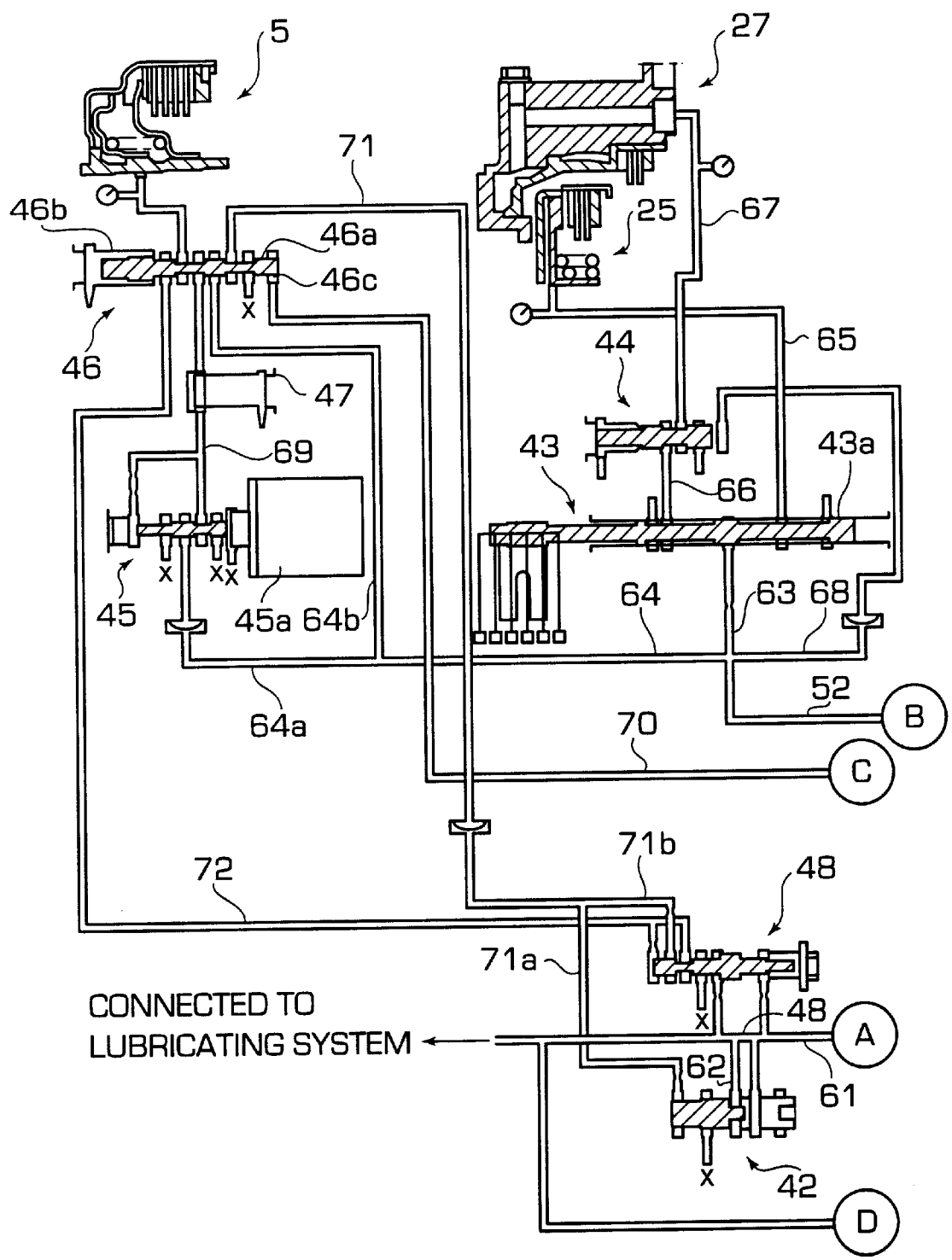
FIG. 4 shows the composition of the hydraulic circuit equivalent to the embodiment of the present invention.

Next, referring to FIGS. 3 and 4, a hydraulic control including the hydraulic circuit according to the present invention will be described. Marks A, B, C and D encircled in FIGS. 3 and 4 respectively denote continuation to a location with the same mark. Marks x in FIG. 5 denote that a part shown by the mark is connected to a drain.

In the hydraulic control, the oil pressure of hydraulic fluid in a tank T supplied from a pump P is regulated by regulator valves 31 and 32 so that oil pressure in an oil passage 51 is line pressure PL and modulator pressure PM is produced by decompressing the line pressure PL using a modulator valve 33.

The modulator pressure PM is supplied to first and second linear solenoid valves 34 and 35 respectively via oil passages 52a and 52b and desired first and second control back pressure PB1 and PB2 is respectively supplied to oil passages 53a and 53b by controlling the energizing of linear solenoids 34a and 35a. The above first and second control back pressure PB1 and PB2 is respectively supplied to first and second pulley control valves 36 and 37 as shown in FIG. 3. The pulley control valves 36 and 37 regulate line pressure PL supplied via the oil passage 51 to produce first and second control oil pressure PC1 and PC2 respectively corresponding to the first and second control back pressure PB1 and PB2. The first and second control oil pressure PC1 and PC2 produced by as described above is respectively supplied to the drive side cylinder chamber 14 and the driven side cylinder chamber 19 via oil passages 55a and 55b.

As described above, transmission can be controlled by controlling the first and second control oil pressure PC1 and PC2 respectively supplied to the drive side cylinder chamber 14 and the driven side cylinder chamber 19 by controlling the energizing of the linear solenoids 34a and 35a and controlling the variable setting of the width of a drive pulley and a driven pulley.

The first and second control back pressure PB1 and PB2 respectively produced by the first and second linear solenoid valves 34 and 35 is also supplied to the regulator valve 32 respectively via oil passages 54a and 54b. Therefore, the regulator valves 31 and 32 receive the control back pressure PB1 and PB2, regulate line pressure PL from an oil passage 56 and set line pressure PL corresponding to higher control back pressure of both control back pressure PB1 and PB2.

Figure 5:
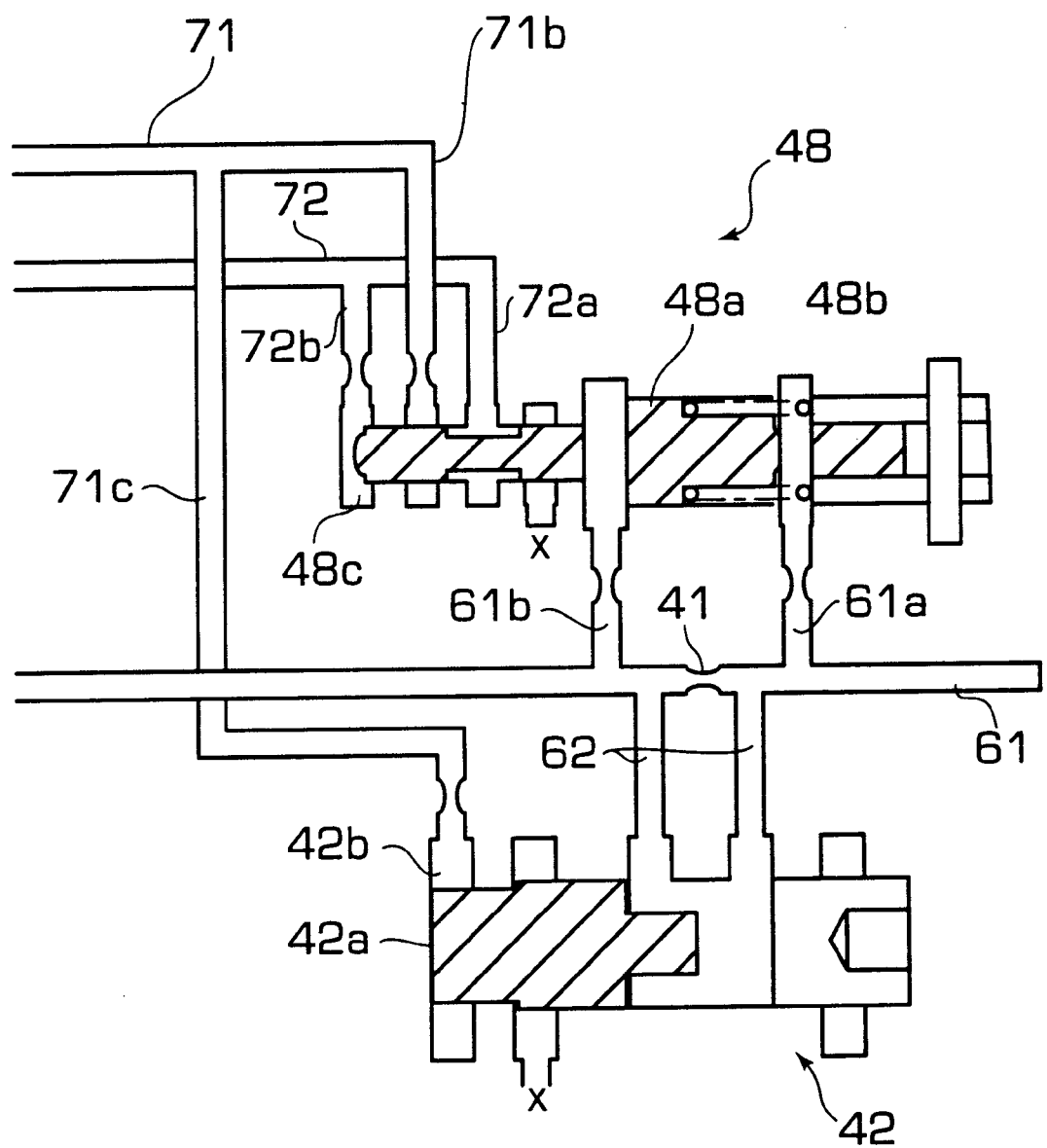
FIG. 5 is a sectional view detailedly showing an S/C backup valve and a bypass closing valve respectively constituting the hydraulic circuit.

Excess oil when line pressure PL is produced by the regulator valves 31 and 32 is discharged to an oil passage 61 and sent to a lubricating system. A restrictor 41 is provided to the oil passage 61 and a bypass oil passage 62 is provided so that the upstream side and the downstream side of the restrictor 41 are connected. A bypass closing valve 42 which can open and close the bypass oil passage is provided on the way of the bypass oil passage 62 and normally (when no electric failure occurs as described later), a spool 42a is located left and opens the bypass oil passage 62. Therefore, hydraulic fluid in the oil passage 61 is sent to the lubricating system mainly through the bypass oil passage 62 without passing the restrictor 41 as shown in FIG. 5.

Apart of modulator pressure PM regulated by the modulator valve 33 is respectively supplied to an oil passage 63 connected to a manual valve 43 via an oil passage 52c, an oil passage 64 connected to the starter clutch 5 and an oil passage 68 connected to a backward brake control valve 44. Oil pressure supplied to the oil passage 63 is switched to another oil passage by manually operating the manual valve 43 to operate the forward clutch 25 or the backward brake 27. That is, when the spool 43a of the manual valve 43 is moved left from a neutral position shown in FIG. 4 to switch to a forward mode, oil pressure in the oil passage 63 is supplied to the forward clutch 25 via the oil passage 65 and when the spool 43a of the manual valve 43 is moved right from the neutral position shown in FIG. 4 to switch to a backward mode, oil pressure in the oil passage 63 is supplied to the backward brake 27 via an oil passage 66, the backward brake control valve 44 and an oil passage 67. The backward brake control valve 44 is controlled based upon modulator pressure PM supplied from the oil passage 68, oil pressure supplied from the manual valve 43 is regulated and supplied to the backward brake 27.

In the meantime, oil pressure supplied to the oil passage 64 is branched into an oil passage 64a connected to the starter clutch control valve 45 and an oil passage 64b connected to a shift control valve 46. The starter clutch control valve 45 supplies desired oil pressure from an oil passage 69 (on the way, an accumulator 47 is provided) to the starter clutch 5 via the shift regulating valve 46 by controlling the energizing of a linear solenoid 45a so as to operate the starter clutch. The energizing of the starter clutch control valve 45 is controlled based upon information from a rotational frequency detector (not shown) for detecting the rotational frequency of the input shaft 1 so as to regulate oil pressure supplied to the starter clutch 5. Hereby, the engagement of the starter clutch 5 can be suitably controlled according to the rotational frequency of the input shaft 1, that is, the speed of the engine ENG and the like.

Next, the control of the starter clutch 5 when failure occurs, for example when the supply of power to the electric control valve is stopped as when the system malfunction will be described. When failure occurs, the first and second linear solenoid valves 34 and 35 are de-energized, are returned to an original position and electric control is disabled. However, at this time, as the first and second linear solenoid valves 34 and 35 are released, back pressure respectively output to the oil passage 53a and the oil passage 53b (back pressure output by regulating modulator pressure PM in the oil passages 52a and 52b) becomes maximum. Hereby, each spool of the first and second pulley control valves 36 and 37 is moved left and released, pulley lateral pressure respectively supplied to the drive side cylinder chamber 14 and the driven side cylinder chamber 19 from the oil passages 55a and 55b becomes maximum and, a hereby, the metallic V belt 15 is prevented from being off when failure occurs.

When the first linear solenoid valve 34 is released in failure as described above, backpressure output to the oil passage 54a (back pressure output by regulating modulator pressure PM in the oil passage 52a) also becomes maximum and is supplied from an oil passage 70 to the oil chamber 46c of the shift regulating valve 46. Hereby, a spool 46a of the shift regulating valve 46 is moved left against rightward pressure by a spring 46b and the oil passage 69 is blocked. Therefore, even if the regulation of the starter clutch control valve 45 is disabled by an electric malfunction in the system, oil pressure from the valve 45 is prevented from being supplied to the starter clutch 5.

Simultaneously, an oil passage 71 is made to communicate with the oil passage 64b and oil pressure in the oil passage 64b is supplied to the oil passage 71. As detailedly shown in FIG. 5, the oil passage 71 is branched into oil passages 71a and 71b, the oil passage 71a is connected to the oil chamber 42b of the bypass closing valve 42 and the oil passage 71b is connected to a Starter Clutch backup valve (hereinafter, referring to as S/C backup valve) 48. When oil pressure is supplied from the oil passage 71a to the oil chamber 42b of the bypass closing valve 42, the spool 42a is moved right and the bypass oil passage 62 is closed. Therefore, hydraulic fluid in the oil passage 61 is all discharged to the lubricating system through the restrictor 41.

In the S/C backup valve 48, a spool 48a receives leftward pressure by a spring 48b, the differential pressure of oil pressure between oil passages 61a and 61b respectively provided before and after the restrictor 41 and pressure in an oil chamber 48c and signal pressure PS determined depending upon balance among these is generated in an oil passage 72 (72a and 72b). The larger the driven quantity of the spool 48a is, the larger the above signal pressure PS is and the larger differential pressure before and after the restrictor 41 is, the larger the driven quantity of the spool 48a is.

Figure 6:
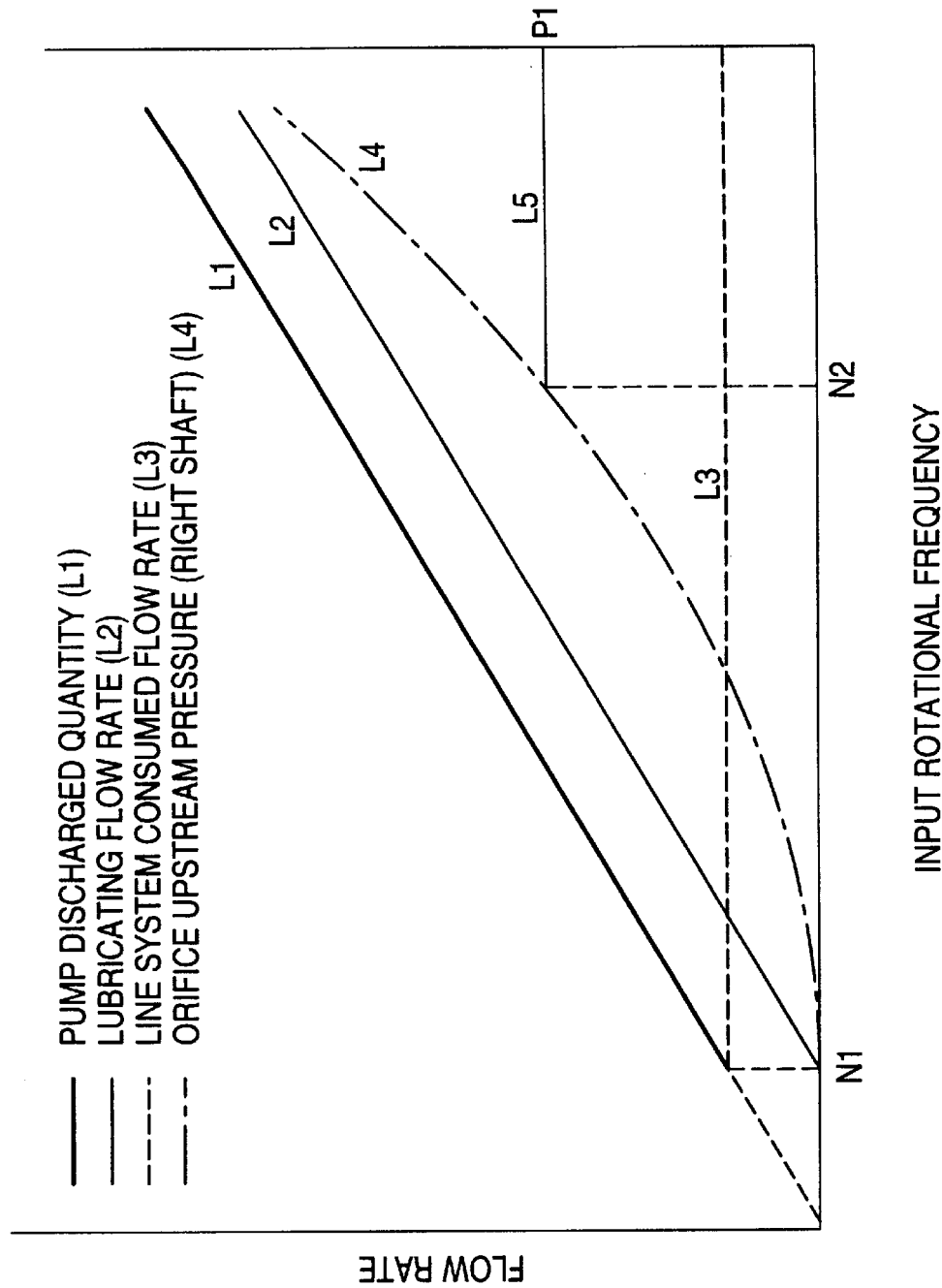
FIG. 6 is a graph showing the relationship of oil pressure controlled by the hydraulic circuit.

FIG. 6 shows relationship among discharged quantity from the hydraulic pump P, the quantity of lubrication oil, flow rate consumed by a line system (a control system using line pressure PL) and pressure on the upstream side of the restrictor 41 for input rotational frequency, that is, the speed of the engine ENG when failure occurs. Pump discharged quantity L1 is increased as input rotational frequency is increased and, therefore, flow rate consumed by the line system L3 is also increased. However, the flow rate consumed by the line system L3 approximately becomes fixed after it reaches predetermined flow rate (an input rotational frequency at this time shall be N1) and slightly varies only in a range in which hydraulic fluid equivalent to quantity leaking from clearance between each valve, clearance between the pulley oil chambers 14 and 19 and others is supplemented. Lubricating flow rate L2 is equivalent to excess oil when the flow rate consumed by the line system L3 is produced based upon the pump discharged quantity L1 and as the pump discharged quantity L1 is increased, the excess oil is also increased in an area larger than a rotational frequency N1. Pressure on the upstream side of the restrictor L4 varies corresponding to lubricating flow rate and is increased as the pump discharged quantity L1 is increased in the area larger than the rotational frequency N1, that is, the speed of the engine ENG is increased.

As described above, pressure on the upstream side of the restrictor 41 is increased as the speed of the engine ENG is increased, however, at this time, differential pressure between before and after the restrictor 41 is also increased. Also, as the larger differential pressure between before and after the restrictor 41 is, the larger signal pressure PS is also as described above, output signal pressure PS is increased as the speed of the engine ENG is increased. As the regulator valves 31 and 32 respectively regulate line pressure PL so that the line pressure is maximum when failure occurs, signal pressure PS can be output in a wide range according to the speed of the engine ENG.

As described above, signal pressure PS output to the oil passage 72 is supplied to the starter clutch 5 via the shift control valve 46 the spool 46a of which is moved left. Hereby, the starter clutch 5 can be controlled so that torque on the input side is transmitted to the output side in a quantity in which torque is transmitted according to the rotational frequency of the input shaft, that is, the speed of the engine ENG. Therefore, even in the case of an electric malfunction in the system, signal pressure PS corresponding to the speed of the engine is supplied to the starter clutch 5 and the operation to some extent of the starter clutch 5 not only when a vehicle is started or stopped but when a vehicle is run can be controlled.

As described above, normally, pressure discharged from the regulator valve 31 is reduced by releasing the bypass oil passage 62 and the regulation of line pressure is not influenced. In the meantime, as the bypass oil passage 62 is closed and signal pressure PS corresponding to the speed of the engine ENG can be generated by the S/C backup valve when failure occurs, the similar effect to that in a case using a generator for generating signal pressure (pitot pressure) using a pitot tube can be obtained.

In the above embodiment, the S/C backup valve 48 outputs signal pressure according to differential pressure between both oil pressure on the upstream side of the restrictor 41 and oil pressure on the downstream side, however, the S/C backup valve may be also a valve constituted so that signal pressure is output based upon only oil pressure on the upstream side simply.

Figure 7:
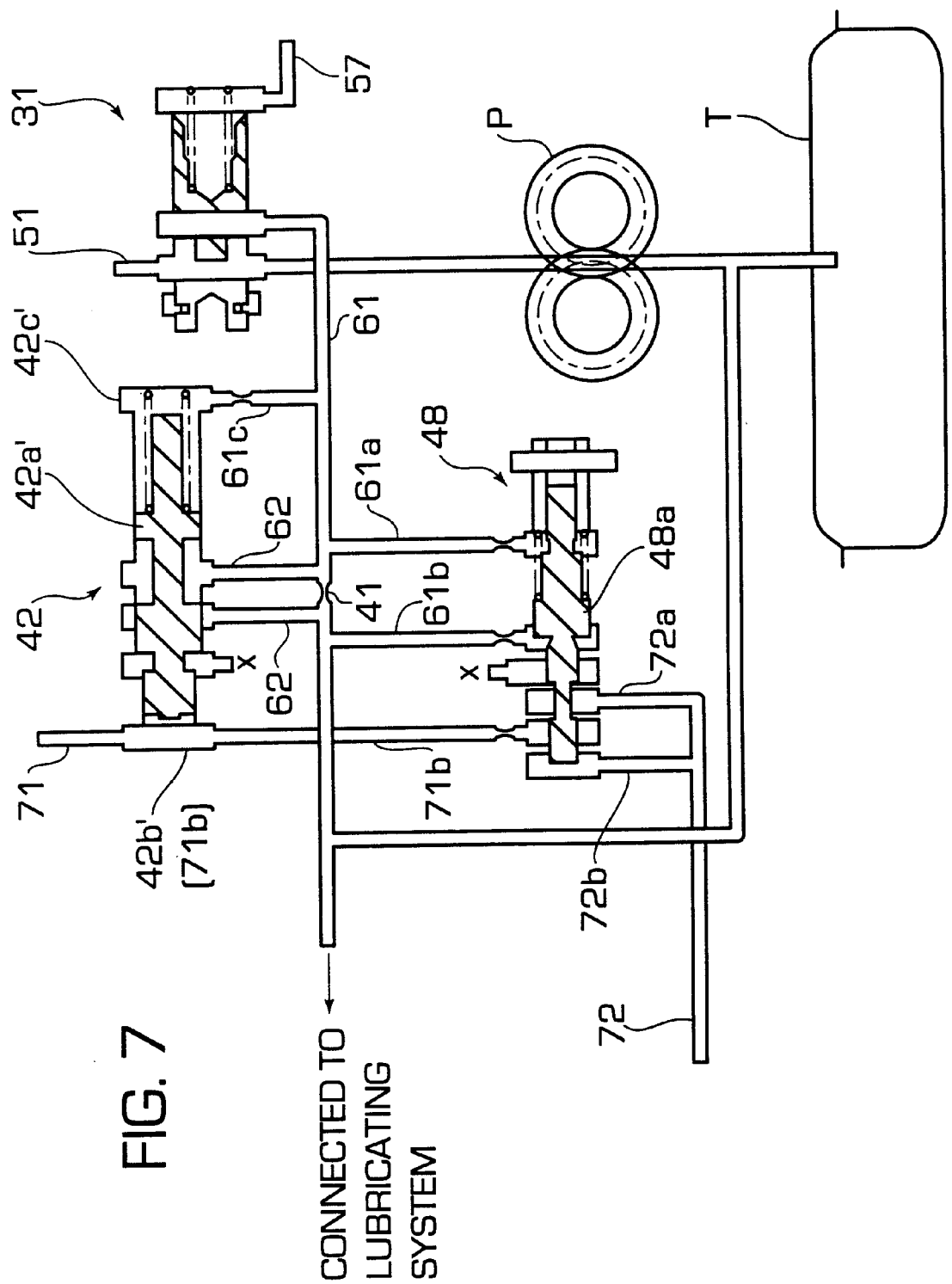
FIG. 7 shows the composition of a hydraulic circuit using a bypass valve in another embodiment.
Figure 8:
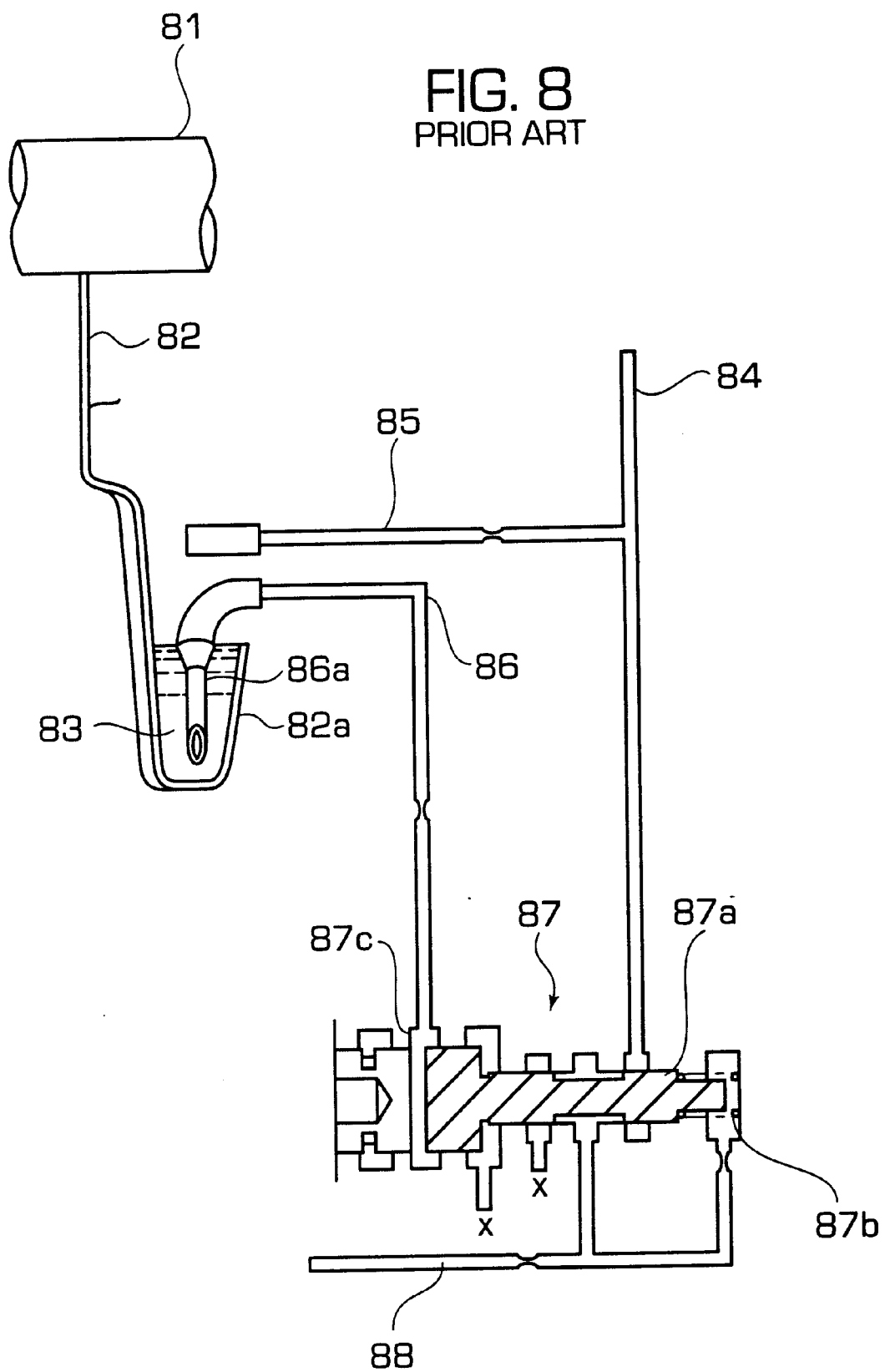
FIG. 8 shows the composition of a conventional type signal pressure output unit using a pitot tube.

The bypass closing valve may be also a valve 42' constituted as shown in FIG. 7 in place of the one described in the above embodiment. A spool 42a of the bypass closing valve 42' is normally pressed left by the force of a spring 42c' and the pressure of hydraulic fluid flowing from an oil passage 61c and hereby, hydraulic fluid in the oil passage 61 is discharged from the bypass oil passage 62 to the lubricating system, bypassing the restrictor 41. Therefore, normally, pressure discharged from the regulator valve 31 is not increased and the regulation of line pressure PL is not influenced.

In the meantime, as oil pressure is supplied from the oil passage 71 as in the case described in the above embodiment when failure such as an electric malfunction in the system occurs, the spool 42a receives rightward force. Hereby, the bypass oil passage 62 is closed, hydraulic fluid in the oil passage 61 passes the restrictor 41, the S/C backup valve 48 regulates oil pressure supplied from the oil passages 71a and 71b and outputs it to the oil passage 72a as signal pressure PS.

However, when in the bypass closing valve 42', oil pressure on the upstream side of the restrictor 41 is increased and leftward oil pressure which acts from the oil passage 61c to the spool 42' is increased, the spool 42' is moved left and signal pressure PS is never increased moreover. That is, as shown by a line L5 in FIG. 6, when oil pressure on the upstream side of the restrictor 41 reaches P1 while an input rotational frequency is N2, the oil pressure remains fixed even if the input rotational frequency N2 is increased. Hereby, pressure discharged from the regulator valve 31 does not exceed a predetermined value P1 and the regulation of line pressure PL can be prevented from being influenced.

As described above, according to the hydraulic circuit according to the present invention, when failure—such as the supply of power is stopped due to a problem in an electric system—occurs, signal pressure according to the speed of the motor is obtained and the operation of the actuator such as the starter clutch of the transmission can be controlled by controlling oil pressure using the above signal pressure. As normally, the bypass oil passage is released and pressure discharged from the regulator valve is kept low, the regulation of line pressure is not influenced.

This application claims the benefit of Japanese Patent Application No. Hei. 10-057827 which is hereby incorporated by reference.

While there has been described a preferred embodiment of the invention, it will be obvious to those skilled in the art that various changes and modifications maybe made therein without departing from the invention, and it is aimed, therefore, to cover in the appended claims all such changes and modifications as fall within the true spirit and scope of the invention.

What is claimed is:

1. A hydraulic circuit for a transmission, comprising:

a regulator valve connected to a hydraulic pump driven by a motor, for regulating oil discharged from the hydraulic pump to produce line pressure;

a plurality of control valves connected to said regulator valve to receive said line pressure, for controlling an operation of the transmission using said line pressure, said control valves including at least one electric control valve;

a restrictor formed on a discharge oil passage which is connected to said regulator valve;

a bypass oil passage for connecting the upstream side and the downstream side of said restrictor while bypassing said restrictor;

a bypass closing valve, connected to said bypass oil passage, for closing said bypass oil passage by receiving oil pressure produced when a supply of power to said at least one electric control valve is stopped; and a signal pressure generating valve, connected to said discharge oil passage, for generating signal pressure which corresponds to one of oil pressure on the upstream side of said restrictor and an oil pressure difference between the upstream side and the downstream side when said bypass oil passage is closed.

2. A hydraulic circuit according to claim 1, in combination with a transmission having a starter clutch, wherein said signal pressure is supplied to the starter clutch of said transmission in such a manner that said starter clutch is controlled on the basis of said signal pressure when the supply of power to said at least one electric control valve is stopped.

* * * * *